United States Patent [19]

Kawabe et al.

[11] Patent Number: 5,260,142
[45] Date of Patent: Nov. 9, 1993

[54] CORROSION-RESISTANT CLAD MATERIAL MADE OF ALUMINUM ALLOYS

[75] Inventors: Tsuyoshi Kawabe, Utsunomiyashi; Tadayoshi Hayashi, Fujimishi; Toshihiro Takeuchi, Utsunomiyashi; Ryotatsu Otsuka, Osakashi; Ichiro Iwai, Oyamashi; Ichizo Tsukuda, Kishiwadashi, all of Japan

[73] Assignee: HONDA Giken Kogyo Kabushiki Kaisha, Tokyo, Japan

[21] Appl. No.: 795,185

[22] Filed: Nov. 18, 1991

[30] Foreign Application Priority Data

Dec. 28, 1990 [JP] Japan .................. 2-408800
Dec. 28, 1990 [JP] Japan .................. 2-408802

[51] Int. Cl.$^5$ .............................................. F28F 19/06
[52] U.S. Cl. ........................ 428/654; 165/134.1; 165/180; 165/905
[58] Field of Search ........... 428/654, 933; 165/905, 165/180, 134.1, 133

[56] References Cited

U.S. PATENT DOCUMENTS

| 3,824,083 | 7/1974 | Fritzlen ................ | 428/654 |
| 3,878,871 | 4/1975 | Anthony et al. ........ | 428/654 |
| 4,209,059 | 6/1980 | Anthony et al. ........ | 428/654 |
| 4,317,484 | 3/1982 | Tonabe et al. ......... | 165/180 |
| 4,560,625 | 12/1985 | Kaifu et al. ........... | 428/654 |
| 4,569,703 | 2/1986 | Baba et al. ............ | 428/654 |
| 4,991,647 | 2/1991 | Kawabe et al. ........ | 428/654 |

FOREIGN PATENT DOCUMENTS

| 54-158312 | 12/1979 | Japan ................... | 428/654 |
| 58-110653 | 6/1983 | Japan ................... | 428/654 |
| 59-100250 | 6/1984 | Japan ................... | 428/654 |
| 59-116353 | 7/1984 | Japan ................... | 428/654 |
| 59-150052 | 8/1984 | Japan ................... | 428/654 |
| 60-138037 | 7/1985 | Japan ................... | 428/654 |

Primary Examiner—John Zimmerman
Attorney, Agent, or Firm—Tilton, Fallon, Lungmus & Chestnut

[57] ABSTRACT

A corrosion-resistant clad material is made of aluminum alloys, and in a preferable mode, comprises: a core which is either formed of an Al-Mn alloy containing 0.5-1.5% by weight of Mn; or alternatively formed of an Al-Mg-Si alloy containing 0.05-1.0% by weight of Mg and 0.05-0.3% by weight of Si. The Al-Mn alloy and Al-Mg-Si alloy further contain, as additional components, 0.05-0.3% by weight of Ti and/or 0.05-0.4% by weight of Zr. The clad material further comprises a skin layer which is formed of an Al-Zn alloy clad onto at least one surface of the core. In another preferable mode, the clad material comprises: a core formed of an Al-Mn alloy containing 0.5-1.5% by weight of Mn; and a skin layer clad onto at least one surface of the core and formed of an aluminum alloy containing 1.3-5.0% by weight of Zn, with or without 0.2-1.0% by weight of Mg, and a balance of aluminum and unavoidable impurities. Cu content as one of the impurities is controlled to 0.05% by weight or less, with the skin layer having a thickness of 30 μm or less.

5 Claims, 1 Drawing Sheet

CORROSION-RESISTANT CLAD MATERIAL MADE OF ALUMINUM ALLOYS

BACKGROUND OF THE INVENTION

1. Field of the Invention

The invention relates to a corrosion-resistant clad material which has a multi-layered structure composed of aluminum alloys and is used to manufacture for example the tubes employed in various types of heat exchangers such as radiators, car heaters, intercoolers or the like.

2. Description of Prior Art

In the manufacture of such heat exchangers which must be highly corrosion-resistant, there has been used an aluminum alloy clad material comprising a core and a skin layer which is formed on at least one surface of the core by the so-called cladding process. The core is a sheet made of an aluminum alloy selected from Al-Mn alloys (i.e., aluminum-manganese alloys including "A3003" series) or Al-Mg-Si alloys (i.e., aluminum-magnesium-silicon alloys called "6000" series) which are easy to process mechanically. The skin layers serving as "sacrificially corroding layers" are made of for example an Al-Zn alloy (i.e., aluminum-zinc alloy). The core is protected from corrosion due to the sacrificial corrosion of the Al-Zn alloy forming the skin layers.

The term "sheet" in this specification is meant to include "films" which and is of a thickness less than 0.25 mm.

It is however noted that the prior art aluminum alloy clad material is disadvantageous due to its drawbacks summarized below.

In general, the constituent parts are brazed to become integral with each other to form such heat exchangers as exemplified above. Zinc atoms in the skin layer tend to diffuse into the core at high temperatures when the clad sheets used as said heat exchanger parts are brazed. With the zinc atoms which probably diffuse deep in the core, it is likely that the corrosion resistance of the core itself becomes so poor that the corrosion resistance of the heat exchanger as a whole cannot be improved to a desirable degree. Heat treatments other than the hot brazing will likewise cause such a problem.

In a case wherein a corrosive medium such as water contacts the inner surfaces of the tubes incorporated in for example a radiator, another type of clad material has been used which comprises the core of "A3003" alloy having its inner surface coated with a skin layer of another aluminum alloy "A7072". The core is easy to work, and the skin layer serves as the sacrificial corrosion layer more effectively than in the general cases as mentioned above.

However, this alternative clad material is also problematic from the following aspect.

Lighter weight and lower manufacturing cost are recently required for the tubes and other parts of the heat exchangers, and therefore efforts have been made to provide thinner parts including the tubes. A thinner core must be covered with thinner "A7072" skin layers 30 μm thick or less. Such extremely thin skin layers will not produce a sufficient effect of sacrificial corrosion, thus causing the core to rapidly corrode impairing the corrosion resistance of the parts.

OBJECTS AND SUMMARY OF THE INVENTION

A first object of the present invention is therefore to provide an aluminum alloy clad material which is of such an improved corrosion resistance that will not be impaired even by any heat-treatment in the brazing or other processes.

A second object of the invention is to provide an aluminum alloy clad material which is of such an improved corrosion resistance that can be maintained even in the case of thinner skin layers having a thickness of 30 μm or less.

The first object is achieved in the invention with a corrosion-resistant aluminum alloy clad material comprising a core and Al-Zn alloy skin layers covering at least one surface of the core, which core is either formed of: an Al-Mn alloy containing 0.5-1.5% by weight of Mn, and one or two additional components which are 0.05-0.3% by weight of Ti and 0.05-0.4% by weight of Zr: or made of an Al-Mg-Si alloy containing 0.05-1.0% by weight of Mg and 0.05-0.3% by weight of Si, and one or two additional components which are 0.05-0.3% by weight of Ti and 0.05-0.4% by weight of Zr. ("Ti" denotes titanium, and "Zr" denotes zirconium.)

The second object is achieved in the invention with a corrosion-resistant aluminum alloy clad material comprising an Al-Mn alloy core and skin layers covering at least one surface of the core and having a thickness of 30 μm or less, which skin layers are formed of an aluminum alloy composed of: 1.3-5.0% by weight of Zn with or without 0.2-1.0% by weight of Mg; and the balance which consists of aluminum and unavoidable impurities, wherein content of Cu as one of the unavoidable impurities is controlled to be 0.05% by weight or less. ("Cu" denotes copper.)

Other objects, features and advantages of the present invention will become clear from the following description made referring to the accompanying drawings.

DETAILED DESCRIPTION OF THE INVENTION

Figure 1:
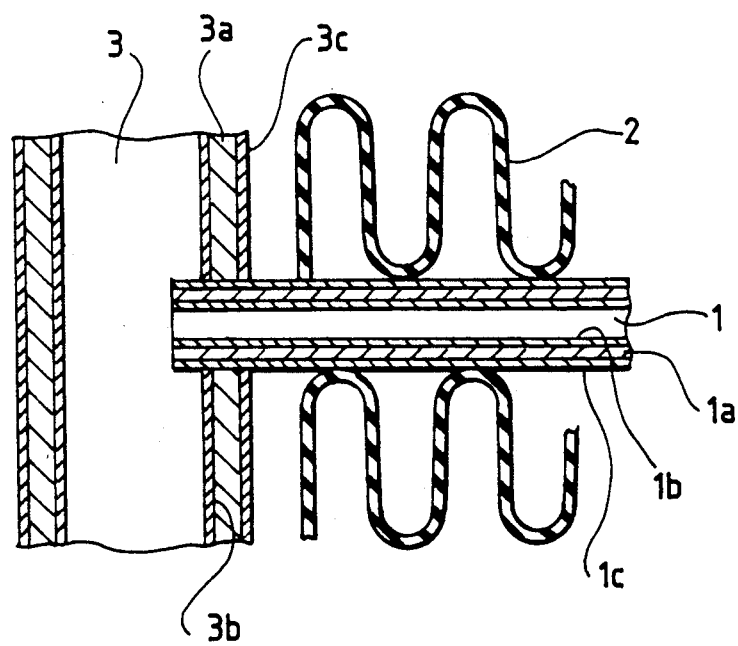
FIG. 1 is a cross-sectional view showing in part an aluminum radiator which is made of a clad sheet provided in the invention.

The present invention provides, in its first mode to achieve the first object, a corrosion-resistant aluminum alloy clad sheet comprising a core and Al-Zn alloy skin layers which are clad to cover at least one surface of the core. The core is formed of an aluminum alloy selected from a group consisting of an Al-Mn alloy and an Al-Mg-Si alloy. The Al-Mn alloy contains 0.5-1.5% by weight of Mn, and further one or two additional components which are 0.05-0.3% by weight of Ti and 0.05-0.4% by weight of Zr. The Al-Mg-Si alloy contains 0.05-1.0% by weight of Mg and 0.05-0.3% by weight of Si, and further one or two additional components which are 0.05-0.3% by weight of Ti and 0.05-0.4% by weight of Zr.

Mn (i.e., manganese) contained in the Al-Mn alloy as the core material gives to the core and the clad material a high mechanical strength, easiness of processing and corrosion resistance, and therefore is regarded as an element effective to improve these properties of the composite clad material composed of the core. A content of Mn below 0.5% by weight renders insufficient the effect, and due to saturation thereof, a superfluous Mn content above 1.5% by weight gives no additional merit which compensates for an increasing cost. Furthermore, an excessive content of Mn will produce coarser crystalline grains which impair the easiness of processing the core. Thus, it is most preferable that Mn content falls within a range of 0.7–1.2% by weight.

Mg (i.e., magnesium) contained in the Al-Mg-Si alloy as the core material contributes to a higher mechanical strength of the core and the clad sheet after heat-treated in the brazing process or the like. A content of Mg below 0.05% by weight renders poor this effect, and a superfluous Mg content above 1.0% by weight gives rise to some problems such as an imperfect brazing of the clad material. Thus, it is most preferable that Mg content falls within a range of 0.2–0.5% by weight.

Si (i.e., silicon) contained in the Al-Mg-Si alloy as the core material contributes also to a higher mechanical strength of the heat-treated core and clad material. A content of Si below 0.05% by weight renders poor this effect, and a superfluous Si content above 0.3% by weight will render insufficient the corrosion resistance. Thus, it is most preferable that Si content falls within a range of 0.1–0.2% by weight.

The additional components Ti (i.e., titanium) and/or Zr (i.e., zirconium), which are contained in the Al-Mn and Al-Mg-Si alloys, prevent Zn atoms in the heated skin layers from inwardly diffusing or migrating into the core and impairing its corrosion resistance. Ti and/or Zr contained in Al-Mg-Si alloy will also inhibit Mg atoms in the heated core from outwardly diffusing into the skin layers. If Mg atoms are permitted to diffuse freely, then local accumulation of Mg within the skin layers would render them more susceptible to corrosion. Since Ti is equivalent to Zr with respect to their function of inhibiting the diffusion of Zn and Mg atoms, addition of at least one of Ti and Zr will suffice. Insufficient contents of both Ti and Zr below 0.05% by weight will fail to prevent such a diffusion of Zn, whereas superfluous contents above 0.3% by weight of Ti or above 0.4% by weight of Zr will not increase the effect any more but result in difficult manufacture of the clad material. Thus, the most preferable content is 0.07–0.15% by weight for both of Ti and Zr.

The aluminum alloy of the core may contain other elements such as Fe (i.e., iron) and Cu (i.e., copper), in addition to those which are already described above. Fe contributes to produce finer crystalline grains, improves mechanical strength, and inhibits intercrystalline corrosion at high temperatures. These effects are poor with a Fe content below 0.03% by weight, but due to saturation of effects, reach an uppermost limit at a content of 1.0% by weight or higher. Thus, the content of Fe which may exist in the alloy must fall within a range of about 0.03–1.0% by weight, and more desirably within a narrower range of 0.1–0.6% by weight. Cu prevents cathode corrosion of the skin layer, and suppresses corrosion from a core's outer surface (that is, from the surface not covered with a skin layer). Cu content below 0.05% by weight does not give such an effect, and a higher Cu content above 0.2% by weight causes diffusion of Cu atoms into the skin layer so that a decreased potential difference between the core and skin layer does not sufficiently prevent the so-called cathode corrosion. Therefore, the content of Cu which may exist in the alloy must be about 0.05 to 0.2%, and more desirably 0.07–0.15% by weight. The Al-Mg-Si alloy forming the core may further contain Mn at a content of about 0.5–1.5%, or more preferably 0.7–1.2% by weight. The function of Mn and the range of its content are the same as those which have been described above for the Al-Mn alloy used to form the core.

Zn (i.e., zinc) contained in the Al-Zn alloy of the skin layers contributes to their sacrificial corrosion so that the core and clad material can resist corrosion. A poor Zn content below 0.8% is however insufficient, while a higher content above 5.0% by weight will undesirably accelerate sacrificial corrosion of the skin layers to rather result in a lower corrosion resistance of the core. Such an excessive Zn content will also impair the rolling property of the alloy or clad sheet. Thus, a preferred range of Zn content is from 0.8 to 5.0%, or more desirably 2–4% by weight.

The alloy forming the skin layers may further contain unavoidable impurities, which are 0.3% by weight or less of Si and also 0.3% by weight of Fe. Cu may also be contained as a further impurity element, but it is desirable to control its content to 0.05% or less. With a higher content above 0.05% by weight, the potential of skin layers becomes high relative to that of the core and as a result the sacrificial corrosion effect of Zn is lowered. Therefore, Cu content is controlled more preferably to 0.01% by weight or less.

To manufacture the aluminum alloy clad material in the first mode of the invention, any special condition need not be employed but such ordinary manners are available as in the case of prior art clad materials. Aluminum alloy ingots are subjected to the homogenizing treatment and are cut into raw thick sheets, i.e., a raw skin sheet and raw core sheet, are successively hot-rolled and cold-rolled together to clad the former onto the latter.

The finished clad material provided in the first mode may be used with its skin layer exposed to a corrosive environment. For example, an aluminum radiator comprising tubes, fin members and header pipes as shown in part in FIG. 1 may comprise each tube made of this clad sheet, wherein an inner skin layer 1b formed of an Al-Zn alloy will be disposed inside as an inner lining to contact the water. It will be understood that it may suffice to clad the skin layer 1b onto at least one surface of a core 1a, with another surface thereof being clad with an outer skin layer, i.e., a brazing agent layer 1c which facilitates the brazing of each fin member 2 to the tubes. The members constituting the radiator in FIG. 1 have the following compositions. The core 1a of the tube 1 having a wall 0.18 mm thick is formed of an aluminum alloy containing: 1 wt % of Mn; 0.1 wt % of Fe; 0.1 wt % of Si; 0.1 wt % of Cu; and 0.15 wt % of Ti (the balance being Al), or alternatively formed of another alloy containing: 1 wt % of Mn; 0.6 wt % of Fe; 0.2 wt % of Si; 0.1 wt % of Cu; and 0.15 wt % of Ti (the balance being Al). The inner skin layer 1b is formed of an aluminum alloy containing 2.5 wt % of Zn (the balance being Al), and the outer skin layer 1c is formed of a "BA4343" alloy. Each fin member 2 having a wall 0.07 mm thick is formed of an Al-Mn alloy containing 0.01–0.1 wt % of In (i.e., indium), and more particularly an alloy containing 1 wt % of Mn and 0.05 wt % of In is suitable for the fin member. Each header pipe 3 having a wall 1.6 mm thick is composed of: a core 3a formed of an "A3003" alloy; an inner skin layer 3b formed of an "A7072" alloy; and an outer skin layer 3c formed of a "BA4045" alloy.

To summarize, the clad material given in the first mode is characteristically composed of: the core formed of the Al-Mn alloy or Al-Mg-Si alloy which contain 0.05-0.3 wt % of Ti and/or 0.05-0.4 wt % of Zr; and the skin layers formed of the Al-Zn alloy and clad onto at least one surface of the core. Ti and Zr are effective to Zn atoms in skin layers from diffusing into the core when heated in the brazing process or other heat treatment, so that the corrosion resistance of the core is not impaired. This function of Ti and Zr will fully ensure the sacrificial corrosion effect of the skin layers whereby not only the core but also the clad material as a whole obtain an excellent level of corrosion resistance.

It is also noted that, in the case of the Al-Mg-Si alloy core, Ti and Zr play a still further role to suppress Mg atoms from diffusing from the core into the skin layers, thus providing the clad material with a more excellent property to resist corrosion.

Next, the second mode of the present invention will be described below in detail. In this mode to achieve the second object, there is provided a corrosion-resistant aluminum alloy clad material comprising: a core formed of Al-Mn alloy containing 0.5-1.5 wt % of Mn; and skin layers which are clad to cover at least one surface of the core. The skin layers are formed of an aluminum alloy which contains 1.3 -5.0 wt % of Zn, with or without 0.2-1.0 wt % of Mg incorporated in addition to Zn; and the balance which is aluminum and unavoidable impurities therein. Cu content as one impurity is controlled to 0.05 wt % or less, and the thickness of the skin layers is controlled to 30 μm or less.

The reason for delimiting the material of the core to the Al-Mn alloy resides in a fact that the incorporation of Mn can give the core a high mechanical strength as well as easiness of processing and a high corrosion resistance to thereby improve these properties of the clad material as a whole. However, a lower Mn content below 0.5 wt % makes insufficient such effects, and on the contrary, a higher content above 1.5 wt % will be useless because of saturation of the effects. Such a superfluous content of Mn will raise manufacture cost to an intolerable degree which cannot be compensated with a slight marginal effect. A preferable range of Mn content is therefore 0.5-1.5 wt %, and more desirably 0.7-1.2 wt %.

The alloy forming the core may further contain for example Si (i.e., silicon), Fe (i.e., iron), Cu (i.e., copper) or other elements. If a content of Si which contributes to a higher mechanical strength of the brazed core is below 0.05 wt %, then this effect is rendered poor, and a superfluous Si content above 0.3 wt % will lower the corrosion resistance. Thus, Si content preferably falls within a range of 0.1-0.2 wt %. Fe contributes to produce fine crystal grains, improves strength, and inhibits intercrystalline corrosion at high temperatures. These effects are poor with a Fe content below 0.03 wt %, but due to saturation of effects, reach an upper limit at a content of 1.0 wt % or higher. Thus, the content of Fe which may exist in the alloy must fall within a range of about 0.03-1.0 wt %, and more desirably within a narrower range of 0.1-0.6 wt %. Cu prevents cathode corrosion of the skin layer, and suppresses corrosion from a core's outer surface (that is, the surface not covered with a skin layer). Cu content below 0.05 wt % does not give such an effect, and a higher Cu content above 0.2 wt % causes diffusion of Cu atoms into the skin layer so that a decreased potential difference between the core and skin layer does not sufficiently prevent the so-called cathode corrosion. Therefore, the content of Cu which may exist in the alloy must be about 0.05 to 0.2 wt %, and more desirably 0.07-0.15 wt %.

The thickness of skin layers is restricted to 30 μm or less because a thickness greater than 30 μm renders difficult to maintain the lightness and reduce manufacture cost of the clad materials and heat exchangers made therefrom.

Corresponding to the thickness of skin layers limited to or below 30 μm, the aluminum alloy contains 1.3–5.0 wt % of Zn. Zn (i.e., zinc) contained in the Al-Zn alloy of the skin layers contributes to their sacrificial corrosion so that the core and clad material resist corrosion. A poor Zn content below 1.3 wt % is however insufficient, while a higher content above 5.0 wt % will undesirably accelerate sacrificial corrosion of the skin layers to rather result in a lower corrosion resistance of the core. Such an excessive Zn content will also impair the rolling property of the alloy or clad material. Thus, a preferred range of Zn content is from 0.8 to 5.0 wt %, or more desirably 2-4 wt %.

Mg (i.e., magnesium) is an optional element which may be added to the alloy forming the skin layers for the purpose of improving the corrosion resistance due to sacrificial corrosion effect. Its content below 0.2 wt % is insufficient for this purpose, but its content above 1.0 wt % is superfluous and useless due to saturation of said effect. The most preferable Mg content is thus from 0.3 to 0.8 wt %. About 0.3 wt % or less of Si and about 0.3 wt % or less of Fe may also be included in the unavoidable impurities. Cu content as one of the impurities must be controlled to 0.05 wt % or less With a higher content above 0.05 % by weight, the potential of skin layers becomes high relative to that of the core and as a result the sacrificial corrosion effect of Zn is lowered. Therefore, Cu content is controlled more preferably to 0.01% by weight or less.

This aluminum alloy clad material in the second mode of the invention can be manufactured under no special condition but in such an ordinary manner available to the prior art clad materials. Aluminum alloy ingots are subjected to the homogenizing treatment and are cut into raw thick sheets, i.e., a raw skin sheet and raw core sheet, which raw sheets are successively hot-rolled and cold-rolled together to clad the former onto the latter.

The finished clad material provided according to the second mode may be used with its skin layer exposed to a corrosive environment. For example, an aluminum radiator comprising tubes, fin members and header pipes as shown in part in FIG. 1 may comprise each tube made of this clad sheet, wherein an inner skin layer 1b formed of an Al-Zn alloy will be disposed inside in contact with water. It will be understood that it may suffice to clad the skin layer 1b onto at least one surface of a core 1a, with another surface thereof being clad with an outer skin layer, i.e., brazing agent layer 1c which facilitates the brazing of the tubes to fin members 2. The members constituting the radiator in FIG. 1 have the following compositions. The core 1a of tube 1 having a wall 0.18 mm thick is formed of an aluminum alloy containing: 1 wt % of Mn; 0.6 wt % of Fe; 0.2 wt % of Si; and 0.13 wt % of Cu (the balance being Al). The inner skin layer 1b is formed of another aluminum alloy containing 2.5 wt % of Zn ( the balance being Al ), and the outer skin layer 1c is formed of a "BA4343" alloy.

Each fin member 2 having a wall 0.07 mm thick is formed of an Al-Mn alloy containing 0.01-0.1 wt % of In (i.e., indium), and more particularly an alloy containing 1 wt % of Mn and 0.05 wt % of In is suitable for the fin member. Each header pipe 3 having a wall 1.6 mm thick is composed of: a core $3a$ formed of an "A3003" alloy; an inner skin layer $3b$ formed of an "A7072" alloy; and an outer skin layer $3c$ formed of a "BA4045" alloy.

It will now be apparent that the clad material provided in the second is excellent in corrosion resistance due to sacrificial corrosion effect of the the skin layers, in spite of their small thickness of 30 μm or less. Such thin skin layers are advantageous in that lighter clad sheet can be manufactured at a lower manufacture cost. This will in turn contribute to production of lighter, cheaper and more corrosion resistant heat exchangers or other apparatuses.

THE PREFERRED EMBODIMENTS

#Examples of First Mode

Listed on Table 1 are samples of the cores made of Al-Mn alloys, and listed on Table 2 are other samples of the cores made of Al-Mg-Si alloys. The former and latter cores were clad with skin layers of such compositions as given on Tables 1 and 2, respectively. Thickness of the cores was set at 1 mm, with the thickness of the skin layers being set at 20 μm, and the following manufacture process was employed.

Raw core sheets 40 mm thick and slabs for forming the skin layers were homogenized at 560° C. for 10 hours before they were cut or shaved into thinner sheets having a thickness of 32 mm. Subsequent to heat treatment at 500° C. for 30 minutes, the thin raw sheets for the cores were hot rolled to become 10 mm thick, and those for the skin layers were also hot rolled to become 0.2 mm thick. Then each core and each skin layer therefor were adjoined one to another to form a raw clad sheet. After these raw clad sheets were heated again at 500° C. for 30 minutes, they were repeatedly hot rolled again until the thickness of each core became 2 mm, and successively cold rolled to give the core thickness of 1 mm.

The finished clad sheets prepared in this manner were subjected to a heating test which, as a simulation of the brazing process, was carried out within an atmosphere of nitrogen gas at 605° C. for 10 minutes.

A cross-sectional line test by "EPMA" was conducted for each specimen of the clad sheets in order to inspect the density of Zn atoms. Density gradient was utilized to determine diffusion depth of Zn. In addition, Mg density on the outer surfaces of the skin layers which were clad onto the Al-Mg-Si cores was analyzed by "QL". Further, a corrosion test to determine the depth of corrosion was also performed for 250 hours according to ASTM D1384-87 method using glass wares, wherein "OY" water (containing: 200

TABLE 1

| Samples | Composition of Core (wt %) | | | | | | | Composition of Skin (wt %) | | | Depth of Zn Diffusion (μm) | Maximum Pin-hole Depth (μm) |
|---|---|---|---|---|---|---|---|---|---|---|---|---|
| | Mn | Ti | Zr | Si | Fe | Cu | Al | Zn | Cu | Al | | |
| Invention | | | | | | | | | | | | |
| 1 | 1.0 | 0.1 | — | — | — | — | * | 1.2 | 0.01 | * | 70 | 50 or less |
| 2 | 1.0 | — | 0.1 | — | — | — | * | 1.2 | 0.01 | * | 70 | 50 or less |
| 3 | 1.0 | 0.2 | — | — | — | — | * | 2.4 | 0.02 | * | 100 | 20 or less |
| 4 | 1.0 | 0.1 | 0.3 | — | — | — | * | 5.0 | 0.05 | * | 150 | 20 or less |
| 5 | 1.0 | 0.2 | — | 0.3 | 0.6 | 0.1 | * | 2.5 | 0.02 | * | 100 | 20 or less |
| 6 | 1.0 | — | 0.2 | 0.3 | 0.6 | 0.1 | * | 5.0 | 0.05 | * | 150 | 20 or less |
| 7 | 1.0 | 0.1 | 0.1 | 0.1 | 0.1 | 0.1 | * | 2.5 | 0.02 | * | 100 | 20 or less |
| 8 | 1.0 | 0.2 | 0.2 | 0.1 | 0.1 | 0.1 | * | 5.0 | 0.05 | * | 150 | 20 or less |
| 9 | 1.3 | 0.2 | — | 0.2 | — | — | * | 3.5 | 0.03 | * | 130 | 20 or less |
| 10 | 1.0 | — | 0.3 | — | 0.3 | — | * | 1.0 | 0.01 | * | 100 | 50 or less |
| 11 | 0.7 | 0.1 | — | — | — | 0.15 | * | 4.0 | 0.04 | * | 140 | 20 or less |
| Reference | | | | | | | | | | | | |
| 12 | 1.0 | — | — | — | — | — | * | 2.4 | 0.3 | * | 200 | 200 or more |

Notes:
(1) Cu in the skin layers is contained as an impurity component.
(2) The symbol * denotes the balance.

TABLE 2

| Samples | Composition of Core (wt %) *1 | | | | | | | Compos'n of Skin *2 | | Depth of Zn Dif. (μm) | [Mg] (%) | Maximum Pin-hole Depth (μm) |
|---|---|---|---|---|---|---|---|---|---|---|---|---|
| | Mg | Si | Ti | Zr | Fe | Cu | Mn | Zn | Cu | | | |
| Invention | | | | | | | | | | | | |
| 1 | 0.2 | 0.2 | 0.1 | — | — | — | — | 1.2 | 0.01 | 70 | 0.1 | 50 or less |
| 2 | 0.3 | 0.1 | — | 0.1 | — | — | — | 1.2 | 0.01 | 70 | 0.2 | 50 or less |
| 3 | 0.1 | 0.1 | 0.2 | — | — | — | — | 2.4 | 0.02 | 100 | 0.1 | 20 or less |
| 4 | 0.8 | 0.3 | 0.1 | 0.3 | — | — | — | 5.0 | 0.05 | 150 | 0.4 | 20 or less |
| 5 | 1.0 | 0.2 | 0.2 | — | 0.6 | 0.1 | 1.0 | 2.5 | 0.02 | 100 | 0.7 | 20 or less |
| 6 | 0.8 | 0.1 | — | 0.2 | 0.6 | 0.1 | 0.8 | 5.0 | 0.05 | 150 | 0.5 | 20 or less |
| 7 | 0.5 | 0.1 | 0.1 | 0.1 | 0.1 | 0.1 | 1.2 | 2.5 | 0.02 | 100 | 0.4 | 20 or less |
| 8 | 0.3 | 0.1 | 0.2 | 0.2 | 0.3 | — | — | 5.0 | 0.05 | 150 | 0.1 | 20 or less |
| 9 | 0.3 | 0.2 | 0.2 | — | — | 0.15 | — | 3.5 | 0.03 | 130 | 0.1 | 20 or less |
| 10 | 0.1 | 0.1 | — | 0.3 | — | — | 1.0 | 1.0 | 0.01 | 70 | 0.1 | 50 or less |
| 11 | 0.5 | 0.2 | 0.3 | — | 0.1 | — | 0.8 | 3.0 | 0.03 | 130 | 0.2 | 20 or less |
| Refer- | | | | | | | | | | | | |

TABLE 2-continued

| Samples | Composition of Core (wt %) *1 | | | | | | | Compos'n of Skin *2 | | Depth of Zn Dif. (μm) | [Mg] (%) | Maximum Pin-hole Depth (μm) |
|---|---|---|---|---|---|---|---|---|---|---|---|---|
| | Mg | Si | Ti | Zr | Fe | Cu | Mn | Zn | Cu | | | |
| ence | | | | | | | | | | | | |
| 12 | 1.0 | 0.2 | — | — | — | — | — | 2.4 | 0.3 | 200 | 1.8 | 500 or more |

Notes:
(1) Cu in the skin layers is contained as an impurity component.
(2) "Compos'n of Skin" is an abbreviation of "Composition of Skin Layers"; "Dif." means "Diffusion"; and [Mg] means Mg concentration in the surface layer.
(3) *1 and *2 indicate that the balance is aluminum.

ppm of $Cl^-$, 60 ppm of $SO_4^{2-}$, 30 ppm of $Fe^{3+}$ and 1 ppm of $Cu^{2+}$) was employed as a corrosive solution maintained at a temperature of $95\pm1°$ C.

Results of those tests are given on Tables 1 and 2.

As shown on these Tables, the clad sheets manufactured in accordance with the invention clearly showed a smaller depth of Zn diffusion and a smaller value of maximum pin-hole corrosion depth than the prior art clad sheets. In other words, the clad sheets of the invention have proved excellent in their corrosion resistance. Besides, Mg diffusion into the skin layers was suppressed for the clad sheets comprising the Al-Mg-Si cores.

Examples of Second Mode

Table 3 gives the composition of the aluminum alloy cores and the skin layers respectively clad onto one surfaces thereof, wherein the finished thickness of the cores and skin layers are 1 mm and 20 μm, respectively. Samples denoted by Nos. 38 and 39 are naked cores comprising no skin layer. Manufacture conditions were as follows. Raw core sheets 40 mm thick and slabs for the skin layers were homogenized at 560° C. for 10 hours before cut or shaved into thinner sheets having a thickness of 32 mm. Subsequent to heat treatment at 500° C. for 30 minutes, the thinned raw sheets for the cores were hot rolled to become 10 mm thick, and those for the skin layers were also hot rolled to become 0.2 mm thick. Then each core and each skin layer were adjoined one to another to form a raw clad sheet. After the raw clad sheets were heated again at 500° C. for 30 minutes, they were repeatedly hot rolled until the thickness of each core became 2 mm, and successively cold rolled to give the core 1 mm thick.

The thus finished clad sheets were thereafter subjected to a heating test which, as a simulation of the brazing process, was carried out in $N_2$ gas at 605° C. for 10 minutes.

A corrosion test to determine the depth of corrosion was also performed for 250 hours according to ASTM D1384-87 method using glass wares, wherein "OY" water (containing: 200 ppm of $Cl^-$, 60 ppm of $SO_4^{2-}$, 30 ppm of $Fe^{3+}$ and 1 ppm of $Cu^{2+}$) was employed as a corrosive solution maintained at a temperature of $95\pm1°$ C.

Results of those tests are given on Table 3.

As shown on this Table, the clad sheets manufactured in accordance with the invention clearly showed a smaller value of maximum pin-hole corrosion depth than the prior art clad sheets. In other words, the clad sheets of the invention have proved excellent in their corrosion resistance.

TABLE 3

| Samples | Composition of Core (wt %) | | | | | Compositon of Skin (wt %) | | | | Maximum Pin-hole Depth (μm) |
|---|---|---|---|---|---|---|---|---|---|---|
| | Mn | Si | Fe | Cu | Al | Zn | Mg | Cu | Al | |
| Inv. | | | | | | | | | | |
| 21 | 1.0 | 0.3 | 0.6 | 0.1 | * | 2.5 | — | — | * | 50 or less |
| 22 | 1.0 | 0.3 | 0.6 | 0.1 | * | 5.0 | — | — | * | 50 or less |
| 23 | 1.0 | 0.1 | 0.1 | 0.1 | * | 2.5 | — | — | * | 50 or less |
| 24 | 1.0 | 0.1 | 0.05 | 0.1 | * | 5.0 | — | — | * | 50 or less |
| 25 | 0.8 | — | — | — | * | 1.7 | — | — | * | 50 or less |
| 26 | 1.2 | — | — | — | * | 3.0 | — | 0.03 | * | 50 or less |
| 27 | 1.3 | 0.2 | — | — | * | 3.5 | — | 0.03 | * | 50 or less |
| 28 | 1.0 | — | 0.3 | — | * | 2.0 | — | 0.02 | * | 50 or less |
| 29 | 0.7 | — | — | 0.15 | * | 4.0 | — | 0.04 | * | 50 or less |
| 30 | 1.0 | — | — | — | * | 2.5 | 0.5 | 0.02 | * | 50 or less |
| 31 | 1.0 | 0.3 | — | — | * | 4.0 | 0.6 | 0.04 | * | 50 or less |
| 32 | 1.0 | — | 0.1 | — | * | 3.0 | 0.8 | 0.03 | * | 50 or less |
| 33 | 1.2 | — | — | 0.1 | * | 2.5 | 0.5 | 0.02 | * | 50 or less |
| 34 | 1.0 | 0.3 | 0.1 | 0.1 | * | 2.5 | 0.4 | 0.02 | * | 50 or less |
| Ref. | | | | | | | | | | |
| 35 | 1.0 | 0.3 | 0.6 | 0.1 | * | 1.0 | — | 0.05 | * | 200 or more |
| 36 | 1.0 | 0.1 | 0.1 | 0.1 | * | 0.5 | — | — | * | 300 or more |
| 37 | 1.0 | 0.3 | 0.6 | 0.1 | * | 2.5 | — | 0.30 | * | 300 or more |
| 38 | 1.0 | 0.3 | 0.6 | 0.1 | * | (no skin layer) | | | * | 700 or more |
| 39 | 1.0 | 0.1 | 0.1 | 0.1 | * | (no skin layer) | | | * | 700 or more |

Notes:
(1) Cu in the skin layers is contained as an impurity component.
(2) The symbol * denotes the balance.

What is claimed is:

1. A corrosion-resistant clad material is made of aluminum alloys, the clad material comprising:
a core formed of an Al-Mn alloy containing from about 0.7 to about 1.5% by weight of Mn to give said core and the clad material high mechanical strength, ease of processing and corresion resistance, and at least one additional component which is selected from the group consisting of 0.05–0.3% by weight of Ti and 0.05–0.4% by weight of Zr; and a skin layer clad onto at least one surface of the core and formed of an Al-Mn alloy, said Al-Zn alloy containing 1.3-5% of Zn.

2. A corrosion-resistant clad material made of aluminum alloys according to claim 1, wherein Mn content in the alloy forming the core falls within a range of 1.0-1.2% by weight, and contents of Ti and Zr each fall within a range of 0.07-0.15% by weight.

3. A corrosion-resistant clad material made of aluminum alloys according to claim 1, wherein the alloy forming the core further contains at least one member selected from the class consisting of 0.03- 1.0% by weight of Fe and 0.05-0.2% by weight of Cu.

4. A corrosion-resistant clad material is made of aluminum alloys, the clad material comprising
a core formed of an Al-Mn alloy containing from about 0.7 to about 1.5% by weight of Mn to give said core and the clad material high mechanical strength, ease of processing and corresion resistance, and at least one additional component which is selected from the group consisting of 0.05-0.3% by weight of Ti and 0.05-0.4% by weight of Zr; and a skin layer clad onto at least one surface of the core and formed of an Al-Zn alloy, said Al-Zn alloy containing 2-4% by weight of Zn.

5. A corrosion-resistant clad material made of aluminum alloys, the clad material comprising
a core formed of an Al-Mn alloy containing from about 0.7 to about 1.5% by weight of Mn to give said core and the clad material high mechanical strength, ease of processing and corresion resistance, and at least one additional component which is selected from the group consisting of 0.05-0.3% by weight of Ti and 0.05-0.4% by weight of Zr; and a skin layer clad onto at least one surface of the core and formed of an Al-Zn alloy, said Al-Zn alloy containing 1.3-5.0% by weight of Zn, and the balance aluminum and unavoidable impurities, one of said impurities being Cu having a content of 0.5% by weight or less, with the skin layer having a thickness of 30 $\mu$m or less.

* * * * *

UNITED STATES PATENT AND TRADEMARK OFFICE
CERTIFICATE OF CORRECTION

PATENT NO. : 5,260,142  
DATED : November 9, 1993  
INVENTOR(S) : Tsuyoshi Kawabe, et al Page 1 of 2

It is certified that error appears in the above-indentified patent and that said Letters Patent is hereby corrected as shown below:

Title page, Item [75] should read:
[75] Tsuyoshi Kawabe, Utsunomiyashi; Tadayoshi Hayashi, Fujimishi; Toshihiro Takeuchi, Utsumomiyashi; Ryotatsu Otsuka, Osakashi; Ichiro Iwai, Oyamashi; Ichizo Tsukuda, Kishiwadashi, Susumu Inoue, Oyamashi; Kazuhiro Kobori, Oyamashi and Hideko Yuasa, Oyasashi, all of Japan.

Column 1, line 31, delete "which and" and insert -- and which --.

Column 5, line 42, cancel "manufacture" and substitute -- manufacturing --.

Column 6, line 42, cancel "condition" and substitute -- conditions --.

Column 8, lines 1 and 2, delete "manufacture" and substitute -- manufacturing --.

Column 10, line 59, delete "is".

Column 11, line 1, delete "Al-Mn" and substitute -- Al-Zn --.

UNITED STATES PATENT AND TRADEMARK OFFICE
CERTIFICATE OF CORRECTION

PATENT NO. : 5,260,142
DATED : November 9, 1993
INVENTOR(S) : Tsuyoshi Kawabe, et al It is certified that error appears in the above-indentified patent and that said Letters Patent is hereby corrected as shown below:

Column 11, line 13, delete "is".

Signed and Sealed this

Second Day of May, 1995

Attest:

BRUCE LEHMAN

Attesting Officer

Commissioner of Patents and Trademarks